US005311380A

United States Patent [19]
Murata et al.

[11] Patent Number: 5,311,380
[45] Date of Patent: May 10, 1994

[54] MAGNETIC HEAD POSITIONING DEVICE AND METHOD

[75] Inventors: Kazuki Murata; Shigeaki Kakiwaki; Tohru Okuda, all of Nara, Japan

[73] Assignee: Sharp Kabushiki Kaisha, Osaka, Japan

[21] Appl. No.: 866,369

[22] Filed: Apr. 10, 1992

[30] Foreign Application Priority Data

Apr. 12, 1991 [JP] Japan .................................. 3-079813

[51] Int. Cl.$^5$ ............................................. G11B 5/584
[52] U.S. Cl. ................................ 360/77.12; 360/77.08
[58] Field of Search ............... 360/77.07, 77.08, 77.12, 360/77.01, 77.11

[56] References Cited

U.S. PATENT DOCUMENTS

| 4,007,493 | 2/1977 | Behr et al. | 360/77.07 |
| 4,347,534 | 8/1982 | Kimura | 360/77.12 |
| 4,796,125 | 1/1989 | Karsh | 360/77.12 |
| 4,953,161 | 8/1990 | Toyama | 360/77.12 |

FOREIGN PATENT DOCUMENTS

| 7229 | 1/1981 | Japan | 360/77.12 |
| 145554 | 11/1981 | Japan | 360/77.12 |
| 62-7398 | 1/1987 | Japan . | |
| WO88/09029 | 11/1988 | PCT Int'l Appl. . | |

OTHER PUBLICATIONS

Abstract of Japanese Application No. JP-A-57 033 455.

Primary Examiner—Louis J. Casaregola

[57] ABSTRACT

A servo track recorded on a magnetic tape is traced by a pair of servo track reproduce heads. The output of the pair of servo track reproduce heads are subjected to a subtracting process by a subtractor. A pulse signal is provided to a stepping motor according to the output of the subtractor. The stepping motor provides a rotation in a positive direction or a negative direction according to the applied pulse. The rotation of the stepping motor is translated to a magnetic head via a moving mechanism whereby the position of the magnetic head is adjusted along the width direction of the magnetic tape to trace properly the data track on the magnetic tape. A closed-loop control system is implemented for the magnetic head to realize tracking control of high precision.

17 Claims, 7 Drawing Sheets

MAGNETIC HEAD POSITIONING DEVICE AND METHOD

BACKGROUND OF THE INVENTION

1. Field of the Invention

The present invention relates to a positioning device for a magnetic head, and more particularly, to a magnetic head positioning device of a fixed head type magnetic recording/reproduction device.

2. Description of the Background Art

A magnetic head is used for recording and reproducing information to and from a magnetic recording medium. The magnetic head carries out recording and reproduction of information by performing an electric-magnetic or magnetic-electric converting operation according to the recorded information or reproduced information.

A magnetic recording/reproduction device using such a magnetic head comprises a rotary head type device having a rotating magnetic head, and a fixed head type device having the magnetic head fixed with respect to the longitudinal direction of the tape.

As shown in the fixed magnetic head type magnetic recording/reproduction device of FIG. 1, a magnetic tape 17 travels in a longitudinal direction of the tape (X direction) parallel to a fixed magnetic head 9. At the time of recording, a signal from magnetic head 9 is recorded on a track 19 parallel to the direction of travel of magnetic tape 17. At the time of reproduction, recording track 19 is traced by fixed head 9, whereby the recorded information are reproduced by fixed head (to be more exact, reproduce head) 9.

In the case a plurality of tracks are provided widthwise of magnetic tape 17, recording/reproduction is carried out by: (a) providing a plurality of magnetic heads widthwise of the tape, (b) moving one magnetic head along the direction of the width of the tape, or (c) combining the methods of (a) and (b) to position the magnetic head at a predetermined position widthwise of the tape.

In the cases of (b) and (c), a stepping motor may be used for moving magnetic head 9 widthwise of the tape. A stepping motor provides a rotation by a predetermined angle for every input pulse.

FIG. 2 is a perspective view of a magnetic head moving system employing a stepping motor. Referring to FIG. 2, magnetic head 9 is fixed on one main surface of a head base 10. A nut 12 abuts against the other main surface of head base 10 in a fixed manner. A lead screw 16 of stepping motor 15 is engaged to nut 12. Stepping motor 15 is fixed to a base 14. Lead screw 16 penetrates base 14. Stepping motor 15 is fixed to base 14 so that lead screw 16 is parallel to guideshafts 11a and 11b which will be described afterwards.

Guideshafts 11a and 11b parallel to each other are fixed to base 14. Guideshafts 11a and 11b penetrate respective holes provided in head base 10. Head base 10 is slidable along guideshafts 11a and 11b. Guideshafts 11a and 11b serve as guiding means for moving magnetic head 9 widthwise and parallel to magnetic tape 17 by means of head base 10.

Head base 10 is prevented from moving in a direction perpendicular to the sliding plane of the magnetic tape (the plane opposing magnetic head) by guideshafts 11a and 11b.

With the aid of pressing plate 13, nut 12 prevents the rotary motion of lead screw 16 with respect to head base 10.

Stepping motor 15 rotates lead screw 16 in response to an applied pulse. In accordance with the rotation of lead screw 16, nut 12 engaged to lead screw 16 moves. This movement of nut 12 causes the movement of head base 10 having magnetic head 9 fixed thereto in the width direction of magnetic tape 17. The amount of movement of magnetic head 9 widthwise of the tape per 1 step of stepping motor 15 is expressed by the following equation:

$$\Delta l_p = P \times \frac{\theta_s}{360}$$

where
$\theta_s$: step angle of stepping motor 15 (deg)
P: pitch of lead screw 16

The step angle of the stepping motor 15 is very precise. By setting lead screw pitch P and step angle $\theta_s$ of the stepping motor to appropriate values corresponding to the amount of the track pitch, magnetic head 9 can move widthwise of the tape to be positioned accurately at a desired track position.

High density recording is required to increase the recording capacity in recent magnetic recording/reproduction devices. A typical method of realizing high density recording is to increase the number of tracks along the width direction of the tape. This will result in a more narrow track width and track pitch.

A flange is generally provided at the widthwise end of a magnetic tape to prevent displacement of the magnetic tape during its travel. Even the provision of such a flange cannot prevent waving during the travel of the magnetic tape, resulting in tracking offset caused by the inability of accurately tracing the appropriate track particularly at the time of reproduction.

When the error between the components in the magnetic head resting position and the error in the mounting position of the record head and the reproduce head widthwise of the track in a magnetic recording/reproduction device are accumulated, the reproduce head deviates from the track to be traced to produce tracking offset.

A guard band is provided between the tracks for preventing crosstalk between adjacent tracks encountered in tracking offset. However, the guard band has a narrow width because of the recent tendency towards narrower track widths and narrower track pitches. There is the possibility of a crosstalk signal in adjacent tracks being mixed into a reproduced signal caused by offset in tracking.

In order to prevent the above-desribed tracking offset, the still position of the stepping motor must be changed finely according to a position error signal, and not by rotation (or movement) at the step unit. The structure of changing minutely the still position of a stepping motor is disclosed in Japanese Patent Laying-Open No. 62-7398.

This conventional system comprises a position error detecting circuit for obtaining the error between the target position and the current position for each predetermined sampling time interval, an integrator for integrating the detected position error during the sampling period, a digital compensating filter for obtaining a corresponding balancing point of a stepping motor (two-phase linear stepping motor) from the output of the position error detecting circuit and the output of the integrator, and a circuit for applying two-phase current to the stepping motor according to the output of the compensating filter for driving the stepping motor to a corresponding balancing point.

In this conventional system, the linear stepping motor takes advantage of an appropriate combination of an A phase current value and a B phase current value to set the balancing point position to an arbitrary position regardless of the mechanical driving pitch. The compensating filter is used to change the balancing point position according to the position error. This compensating filter requires a shift register, an adder and a multiplier for carrying out Z transformation to obtain the offset of the reference balancing point to a desired balancing point. Therefore, the structure of the device is complex and large.

SUMMARY OF THE INVENTION

An object of the present invention is to provide a magnetic head positioning device that can prevent tracking offset easily and reliably with a simple circuit structure.

Another object of the present invention is to provide a magnetic head positioning device that realizes high precision tracking of a magnetic head in a fixed head type magnetic recording/reproduction device.

A magnetic head positioning device according to the present invention includes two servo track reproduce heads for reproducing a servo signal from a servo track recorded on a magnetic tape, a subtractor for obtaining the difference between the output signals of the two servo track reproduce heads, and circuitry for driving a stepping motor so that the level of an error signal which is the output signal of the subtractor becomes "0".

The two servo track reproduce heads are provided separate from each other for reproducing signals from positions in the servo track differing in the width direction of the magnetic tape.

The stepping motor moves the magnetic head widthwise of the magnetic tape for a distance corresponding to the moving step.

The stepping motor is driven so that the difference in the outputs of the two servo track reproduce heads becomes 0 to realize closed-loop control for the position of the magnetic head, high precision control is realized for the positioning of a magnetic head to result in precision tracking of a magnetic head. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only and thus are not limitative of the present invention, and wherein.

DESCRIPTION OF THE PREFERRED EMBODIMENTS

Figure 3:
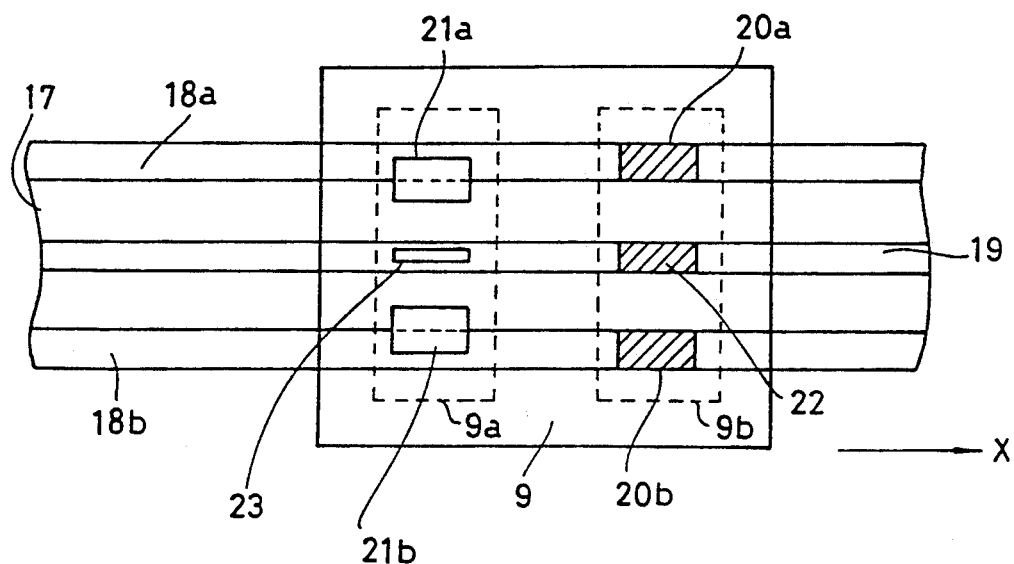
FIG. 3 shows the arrangement of a magnetic head used in the present invention.

FIGS. 3 shows a structure of a magnetic head used in the present invention and the arrangement of the servo track and the data track on a magnetic tape. Referring to FIG. 3, magnetic head 9 includes a reproduce head 9a and a record head 9b. Record head 9b includes servo signal record heads 20a and 20b for recording a signal for servo control at both widthwise ends of magnetic tape 17, and a data signal record head 22 provided between servo signal record heads 20a and 20b for recording a data signal. Servo signal record heads 20a and 20b record a servo signal in servo tracks 18a and 18b provided at the widthwise ends of magnetic tape 17. Data signal record head 22 records a data signal in data track 19.

Reproduce head 9a includes servo track reproduce heads 21a and 21b provided corresponding to servo tracks 18a and 18b, and a data track reproduce head 23 provided corresponding to data track 19. Reproduce head 9a and record head 9b may be formed on separate substrates, or may be formed on the same substrate. Any structure is available as long as the position of heads 22 and 23 in the width direction of the magnetic tape is adjustable according to the outputs of servo signal reproduce heads 21a and 21b.

Servo signal record heads 20a and 20b are arranged to substantially overlap with servo tracks 18a and 18b, respectively, in a plane view. Servo track reproduce heads 21a and 21b are arranged to have a non-overlapping portion with respect to corresponding tracks 18a and 18b when the level of both the output signals is equal (i.e. when tracking is carried out properly). The non-overlapping portion is located inwards the magnetic tape in width direction. FIG. 3 shows the state where the inner portion of servo track 18a overlaps with the outer portion of servo track reproduce head 21a, and where the inner portion of servo track 18b overlaps with the outer portion of servo track reproduce head 21b.

The servo signal must have the position offset of magnetic head 9 (data signal record head 22 and data track reproduce head 23) to data track 19 precisely reflected in the outputs of servo track reproduce heads 21a and 21b.

At the time of data recording, a servo signal is recorded onto servo tracks 18a and 18b by servo signal record heads 20a and 20b.

Then, servo track reproduce heads 21a and 21b reproduce the servo signals recorded in servo tracks 18a and 18b to adjust the position of magnetic head 9 so that the level of the outputs of reproduce heads 21a and 21b are identical using a circuit that will be described later. Concurrently with this operation, data signal record head 22 records a data signal.

In the structure shown in FIG. 3, record head 9b is disposed downstream of the travel of the tape (X direction), whereby a servo signal is recorded in servo tracks 18a and 18b. Recording of a data signal onto data track 19 is carried out concurrently with the tracking control by a servo signal reproduced by servo track reproduce heads 21a and 21b.

Servo signal record heads 20a and 20b do not have to be provided if servo signals are recorded in servo tracks 18a and 18b at the time of tape manufacturing.

The implementation of adjusting the position of magnetic head 9 according to a reproduced signal by servo track reproduce heads 21a and 21b will be described hereinafter.

Figure 4:
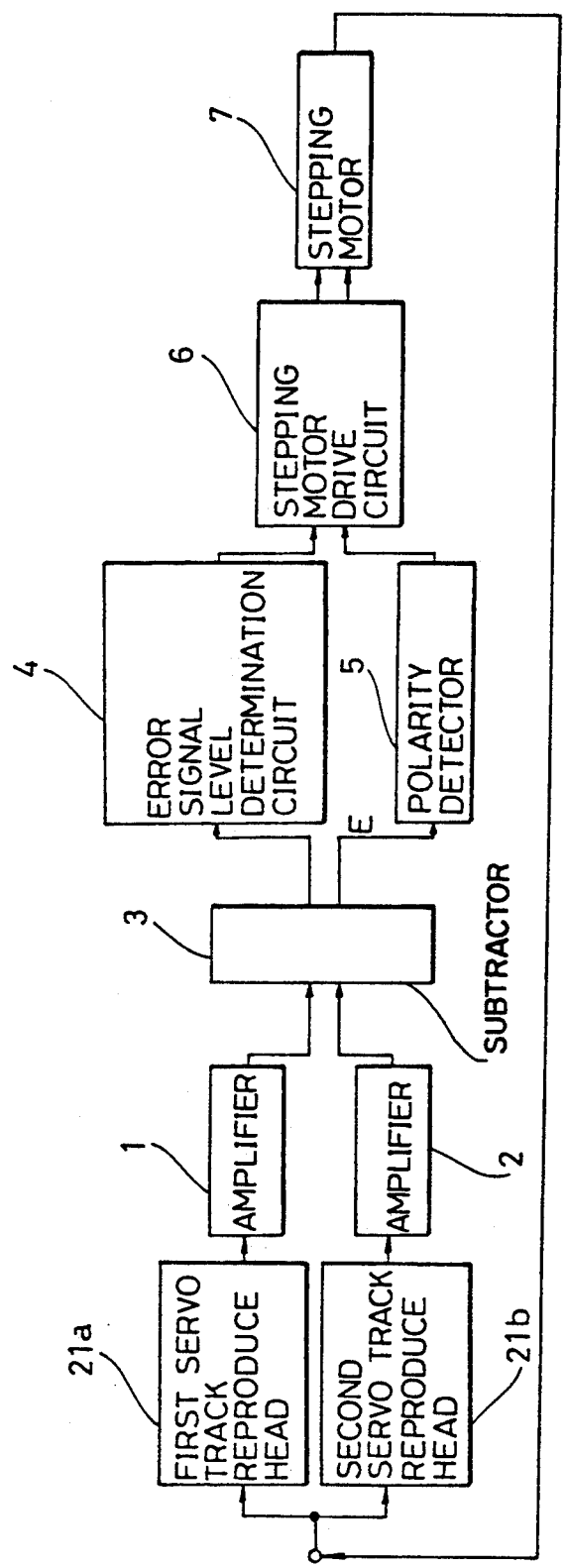
FIG. 4 shows a structure of a magnetic head positioning device according to an embodiment of the present invention.

FIG. 4 shows the entire structure of a magnetic head positioning device according to an embodiment of the present invention. Referring to FIG. 4, the magnetic head positioning device includes amplifiers 1 and 2 for amplifying a servo signal reproduced by servo track reproduce heads 21a and 21b, and a subtractor 3 for obtaining the difference between the output signals of amplifiers 1 and 2.

Servo track reproduce heads 21a and 21b produce a signal proportional to the area of the overlapping portion with the corresponding servo tracks of 18a and 18b. If magnetic head 9 is located at the proper position, the level of the output signals of servo track reproduce heads 21a and 21b are identical. The difference in the level of the reproduced servo signal outputs of servo track reproduce heads 21a and 21b corresponds to the amount of position offset of magnetic head 9. More specifically, the output of subtractor 3 is an error signal E representing the offset of magnetic head 9 from the proper position.

When the level of error signal E is 0, data signal record head 22 satisfies the target position relation with respect to servo tracks 18a and 18b. In the present embodiment, a closed-loop control is executed so that the level of error signal E is 0.

Figure 1:
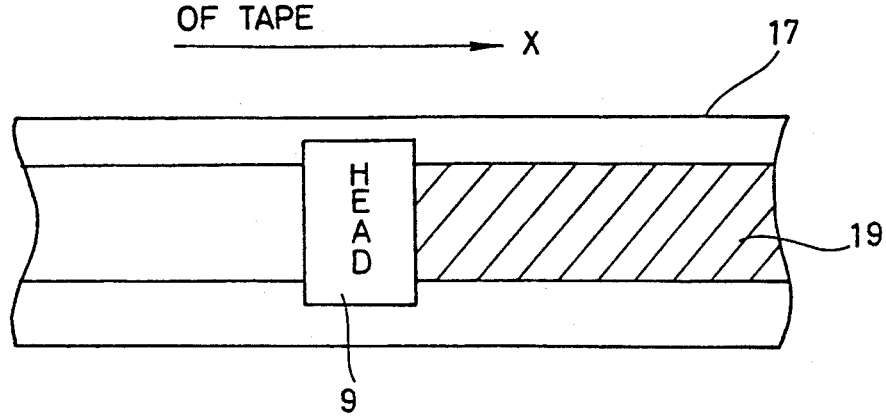
FIG. 1 shows the relative position relationship of a magnetic tape, a data track, and a magnetic head.
Figure 2:
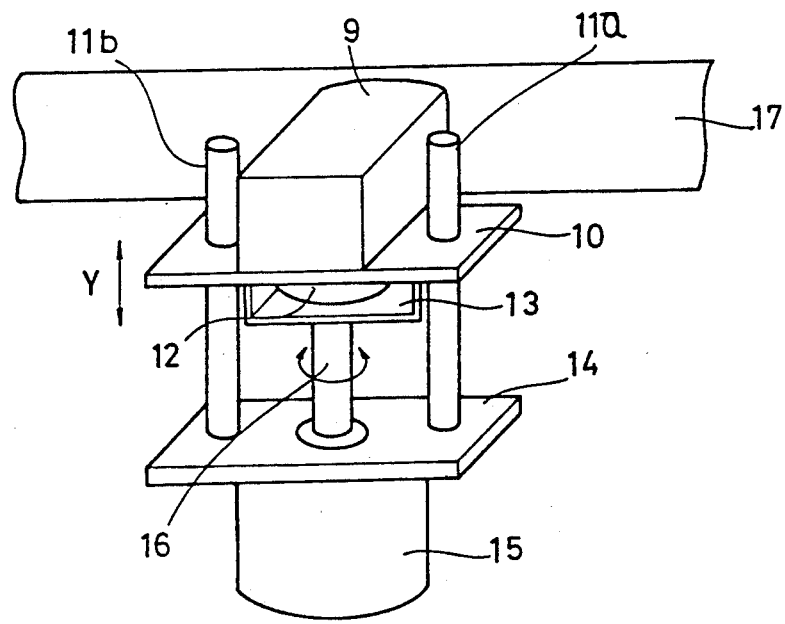
FIG. 2 is a perspective view of a specific structure of a magnetic head assembly.

The positioning device further includes an error signal level determination circuit 4 for determining whether the level of error signal E from subtractor 3 is greater than a predetermined level, a polarity detector 5 for detecting the polarity of error signal E from subtractor 3, and a stepping motor drive circuit 6 responsive to the outputs of error signal level determination circuit 4 and polarity detector 5 for driving stepping motor 7. Stepping motor 7 moves magnetic head 9 widthwise of magnetic tape 17 via a lead screw, as shown in FIG. 2.

Error signal level determination circuit 4 compares the level of an absolute value of an output signal of subtractor 3 with a predetermined reference level. When the level of the absolute value of the output signal of subtractor 3 is less than the predetermined reference level, stepping motor drive circuit 6 does not drive stepping motor 7. Error signal level determination circuit 4 has the function to provide a threshold value of the absolute value of error signal E. An error signal E less than this threshold value is determined to be a noise. Error signal level determination circuit 4 can easily be implemented with an absolute value circuit which takes the absolute value of an output signal of subtractor 3, and a comparison circuit for comparing the output of the absolute value circuit with a reference voltage. Alternatively, error signal level determination circuit 4 may be implemented with two comparison circuits for comparing the output signal of subtractor 3 with reference voltages Vref and -Vref, and a gate circuit for receiving the outputs of the two comparison circuits.

Polarity detector 5 merely detects whether the output signal of subtractor 3 attains a negative level or a positive level, and can be easily implemented with a comparison circuit comparing the output signal of subtractor 3 with ground potential. The output signal of polarity detector 5 indicates the widthwise direction of the offset of data signal record head 5 with respect to the target position. The output signal of polarity detector 5 determines the rotation direction of the stepping motor, i.e. the moving direction of magnetic head 9.

Stepping motor drive circuit 6 drives the stepping motor for rotation by 1 step according to the output of polarity detector 5, when the output of error signal level determination circuit 4 indicates that the amplitude of the output signal of subtractor 3 is greater than a predetermined value. Stepping motor drive circuit 6 may be implemented to sample the outputs of error signal level determination circuit 4 and polarity detector 5 for a predetermined time interval to drive the stepping motor according to the sampling result. In this case, error signal level determination circuit 4 may use a structure where the output of subtractor 3 is integrated during the sampling period.

Error signal level determination circuit 4 is provided for the following reasons.

The polarity of error signal E is detected by polarity detector 5. Stepping motor drive circuit 6 drives stepping motor 7 for rotation by one step so that the position error of data signal record head 22 approaches "0" according to the detected polarity information.

In response to the operation of stepping motor 7, data record signal head 22 moves a distance corresponding to 1 step towards the target position (refer to the structure of FIG. 2).

A reproduced signal from servo track reproduce heads 21a and 21b is provided again with respect to the resulting position obtained by this move. According to the reproduced signal, adjustment of the position of data signal record head 22 is carried out again.

The above-described operation is carried out according to the drive pulse rate of stepping motor 7. The positioning device implements a closed-loop control system as its entirety. Here, the drive pulse rate is the oscillation pulse provided from an oscillation circuit included in stepping motor drive circuit 6 which is generated at a predetermined period. The oscillation pulse determines the angle of 1 step of stepping motor 7, as well as the operation timing of stepping motor drive circuit 6.

According to the polarity of error signal E, stepping motor 7 rotates in either direction for each period determined by the drive pulse rate.

When the position error is relatively great, i.e. when the amplitude of position error signal E is relatively great, there is no particular problem since the stepping motor is driven continuously towards the target position.

When the position error is significantly small, i.e. when the amplitude of position error signal E is small, particularly when the position error is less than ½ step of stepping motor 7, stepping motor 7 will rotate for 1 step to result in a greater position error.

More specifically in the case of a minute position error, stepping motor 7 rotates for 1 step to approximate the position error to "0" according to the polarity of the minute position error signal. This will result in a position error of reverse polarity with the possibility of the absolute value of the position error being greater than that prior to the rotation of 1 step of stepping motor 7.

The level of the minute position error signal approaches the noise level included in the signal. This results in a state where polarity determination of position error signal E is carried out according to the noise, causing stepping motor 7 to be driven in a direction offset of the proper target position. There is the possibility of a greater position error.

Error signal level determination circuit 4 is provided for the purpose of preventing erroneous control caused by such a minute position error signal and noise. A level greater than a position error signal level corresponding to ½ step of stepping motor 7 is used as the predetermined reference level of error signal level determination circuit 4. Stepping motor 7 is not driven when the level of the absolute value of position error signal E is less than this predetermined reference level. Thus, the above-described behavior of increase in position error can be prevented effectively.

Figure 5:
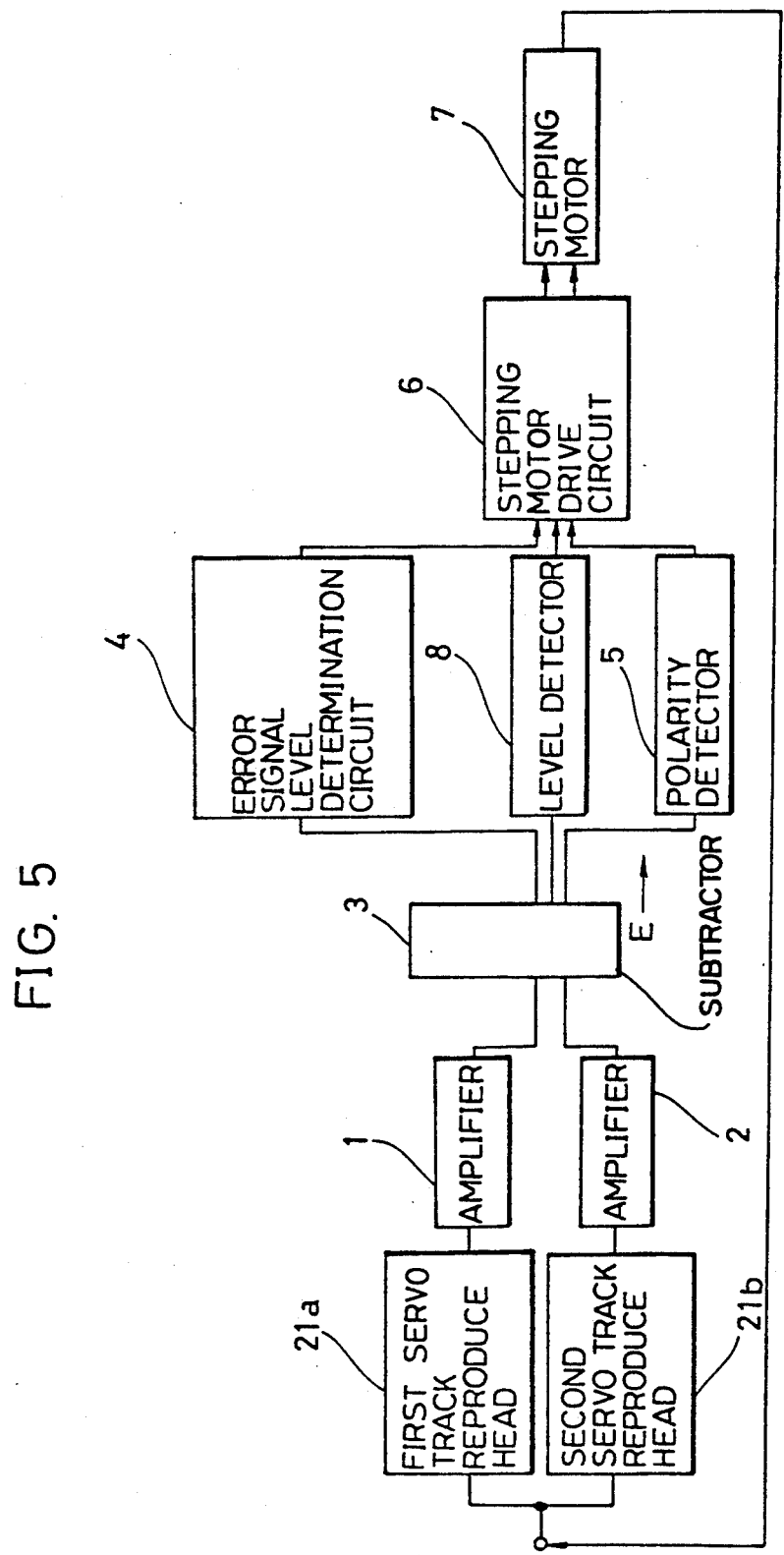
FIG. 5 shows a structure of a magnetic head positioning device according to another embodiment of the present invention.

FIG. 5 shows a structure of a magnetic head positioning device according to another embodiment of the present invention. The device of FIG. 5 includes a level detector 8 for detecting the level of position error signal E from subtractor 3, in addition to the devices of FIG. 4. The level of level detector 8 is provided to stepping motor drive circuit 6. The function of level detector 8 will be described hereinafter.

When the drive pulse rate of stepping motor 7 is constant as shown in FIG. 6(a), eight drive pulses are required when the current position of data signal record head 22 is X1 and the target position is A. When the current position is X2 and the target position is A, four drive pulses will be required. This is because the moving amount of stepping motor 7 per 1 step is constant.

Figure 6:
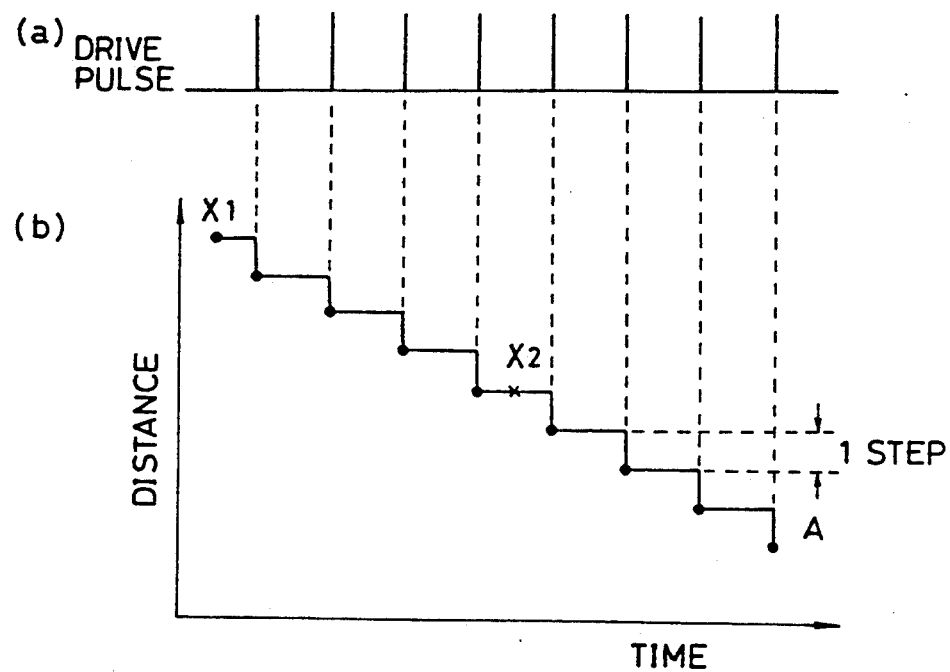
FIG. 6 shows the relation between a stepping motor drive pulse rate and the position movement of the magnetic head.

The drive pulse rate determining the interval of each step governs the followability of stepping motor 7. When the distance between the current position and the target position of magnetic head 9 (data signal record head 22) is great as shown in FIG. 6, i.e. when the level of the absolute value of position error signal E is high, the time to reach the target position is great which degrades followability. In other words, if the drive pulse rate is fixed, the followability with respect to position error of stepping motor 7 changes according to the position error.

Level detector 8 is provided to compensate for the change in followability of stepping motor 7 with the position error.

Figure 7:
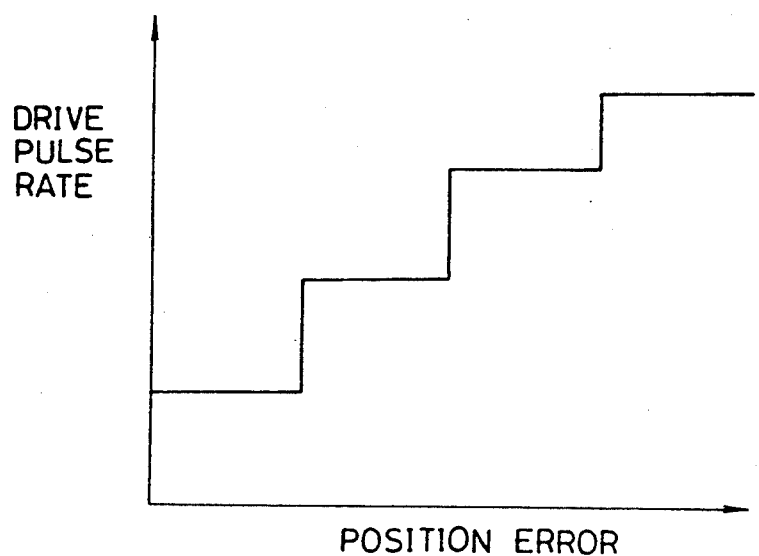
FIG. 7 shows the relation between a stepping motor drive pulse rate and a position error signal level according to another embodiment of the present invention.

As shown in FIG. 7, the drive pulse rate of stepping motor 7 is increased in proportion to the increase in position error. This means that when data signal record head 22 has a great position error, more drive pulses are generated to increase the number of moving steps of stepping motor 7. The followability of stepping motor 7 with respect to position error is improved since stepping motor 7 has its number of moving steps increased according to a great change of the amount of head position error.

Figure 8:
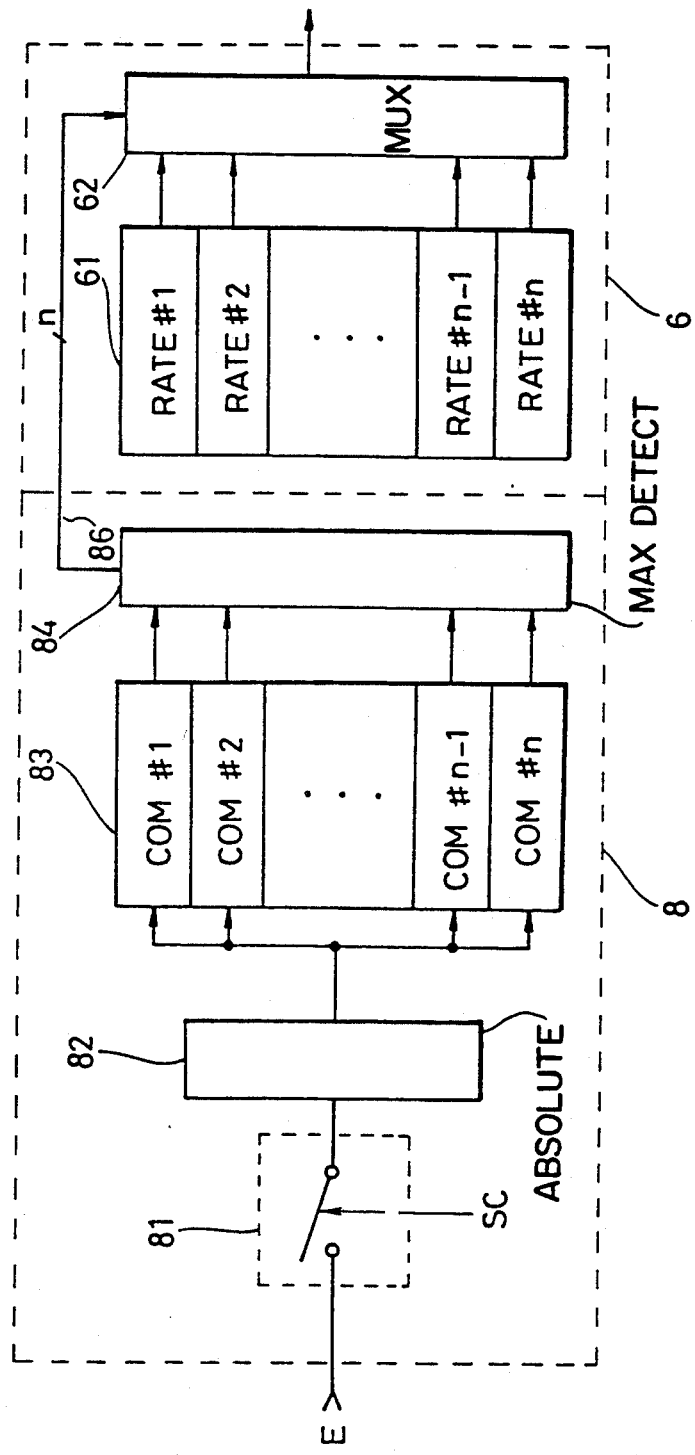
FIG. 8 specifically shows a structure of the level detector and the stepping motor drive circuit of FIG. 5.

FIG. 8 shows the structures of the level detecting circuit and the stepping motor drive circuit of FIG. 5 associated with the drive pulse rate conversion. Referring to FIG. 8, level detector 8 includes a sampler 81 for sampling position error signal E from subtractor 3 at a predetermined period, an absolute value circuit 82 for obtaining the absolute value of an output signal of sampler 81, a comparison circuit group 83 for comparing the output of absolute circuit 82 with a predetermined reference voltage, and a maximum value detecting circuit 84 for detecting an active comparison circuit COM having the maximum level among the active comparison circuits in the group 83. Comparison circuit group 83 includes n comparison circuits of COM#1–COM#n. Comparison circuit COM#p ($1 \leq p \leq n$) compares reference voltage p·V with the output of absolute value circuit 82.

Maximum value detecting circuit 84 includes a control bus 86 formed of n signal lines for generating an activation signal to a signal line corresponding to a comparison circuit COM of a maximum level among the comparison circuits providing a signal of an active state.

Stepping motor drive circuit 6 includes an oscillation circuit group 61 for generating drive pulses of different oscillation period, and a multiplexer 62 responsive to the output of maximum value detecting circuit 84 for selectively passing the output of a corresponding oscillation circuit from oscillation circuit group 61. Oscillation circuit group 61 can generate pulse signals having driving rates of RATE#1–RATE#n.

Maximum value detecting circuit 84 may be implemented by a mismatch detecting circuit receiving the outputs of two adjacent comparison circuits. However, for comparison circuit COM#n of a maximum level, a mismatch detecting circuit having one input fixed to "L" is used.

Multiplexer 62 includes a transmission gate provided corresponding to each oscillation circuit, whereby one of the transmission gates is turned on by the signal on control bus 86.

The most delayed oscillation signal of oscillation circuit group 61 may be used as the sampling clock SC of sampler 81. This structure provides the structure of a variable pulse rate since the number of generated drive pulses changes according to the position error per 1 period of sampling signal SC.

Although the operation is carried out in an analog manner in the above description, an A/D converter may be provided at the succeeding stages of amplifiers 1 and 2 shown in FIGS. 4 and 5 to carry out the operation in a digital manner.

By reproducing servo signals recorded on servo tracks 18a and 18b with two servo track reproduce heads 21a and 21b provided corresponding to servo tracks 18a and 18b, and recording a data signal into data track 19 while carrying out closed-loop control according to the difference between the reproduced servo signals, data track 19 is recorded with a wave similar to that of recorded servo tracks 18a and 18b.

By carrying out closed-loop control for the position of the magnetic head similar to that at the time of data track recording when reproducing data track 19 by data track reproduce head 23, data track reproduce head 23 can trace precisely data track 19 even if it has a wave.

The coexistence of stability and followability is difficult to obtain in a closed-loop control system using a stepping motor. However, the above-described control system structure allows the realization of a closed-loop control system of high stability and followability with a relatively simple structure, not requiring a compensating filter and the like for obtaining stability.

The structure of the magnetic head shown in FIG. 3 has servo tracks 18a and 18b arranged at the widthwise ends of a magnetic tape, with servo track reproduce heads 21a and 21b arranged in one line. There is another method of recording a servo track and a data track on a magnetic tape and reproducing therefrom. An embodiment of this method is shown in FIG. 9.

Figure 9:
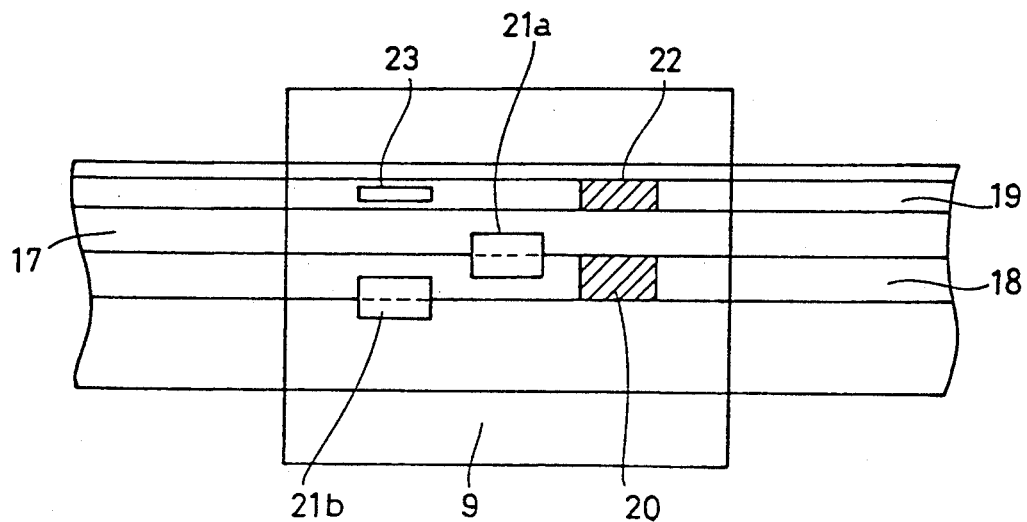
FIG. 9 shows another structure of a magnetic head used in the present invention.

Referring to FIG. 9, servo track 18 is recorded at one widthwise end of magnetic tape 17 by servo signal record head 20. Servo track reproduce heads 21a and 21b are disposed at the respective widthwise ends of servo track 18. The position of servo track reproduce head 21a is staggered from the position of servo track reproduce head 21b in the direction of the width of the tape. Data track reproduce head 23 is aligned with data signal reproduce head 22 and servo track reproduce head 21b lengthwise and widthwise, respectively.

Servo track reproduce heads 21a and 21b are arranged so that the difference of the level of the output signals thereof is 0 and to have an overlapping portion and a non-overlapping portion with respect to servo track 18, when data recording head 22 (or reproduce head 23) is located at the target position. The recording of each track can be carried out by the following methods.

Figure 10:
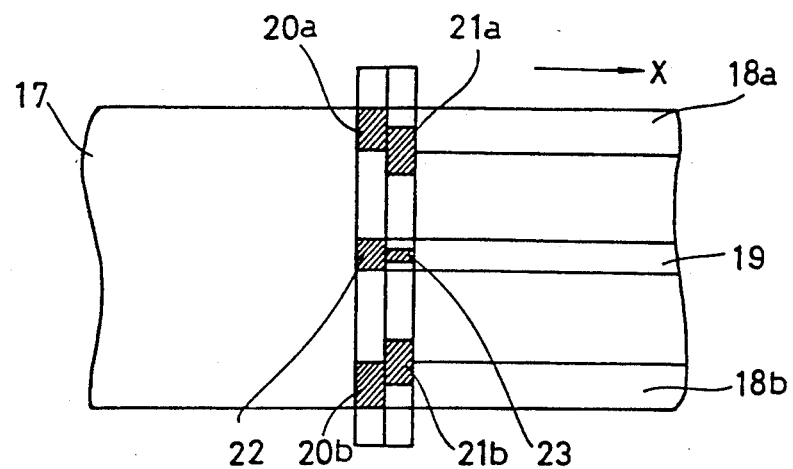
FIG. 10 is a diagram for describing a method of data track and servo track recording according to the present invention.

A first method records simultaneously servo tracks 18a and 18b and data track 19, as shown in FIG. 10. Referring to FIG. 10, record heads 20a, 20b and 22 are disposed upstream of the travel direction of the tape, and reproduce heads 21a, 21b and 23 are disposed downstream. Concurrently with recording by record heads 20a, 20b, and 22, head position control is carried out according to the reproduced signal from servo track reproduce heads 21a, and 21b.

Figure 11A:
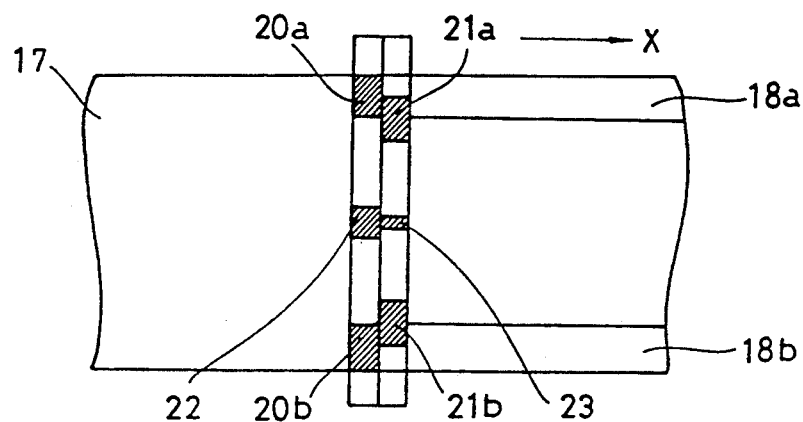
FIGS. 11A and 11B are diagrams showing another method of data track and servo track recording according to the present invention.
Figure 11B:
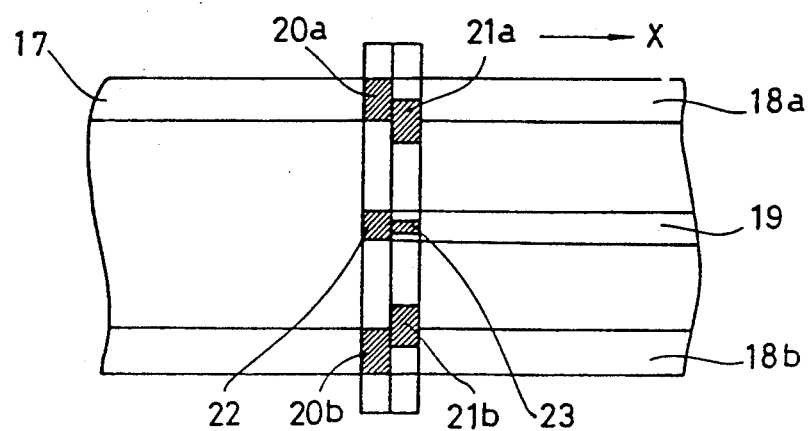

A second method is shown in FIGS. 11A and 11B. In the second method, servo track 18a and 18b and data track 19 are recorded at separate and independent sequences.

Referring to FIG. 11A, servo tracks 18a and 18b are recorded on magnetic tape 17 by servo signal record heads 20a and 20b. Servo track reproduce heads 21a and 21b do not operate.

Referring to FIG. 11B, the recorded servo tracks are reproduced by servo track reproduce heads 21a and 21b. Data track 19 is recorded by data signal record head 22 while carrying out tracking servo control according to the reproduced servo signal.

In the case of reproducing recorded data according to the methods shown in FIGS. 10, 11A and 11B, data track 19 is traced to reproduce data by data track reproduce head 23, while reproducing servo tracks 18a and 18b by servo track reproduce heads 21a and 21b and carrying out tracking servo control.

In the structure shown in FIG. 8, sampling signal SC of position error signal E was described to allow the use of the most delayed stepping motor drive pulse. The rate of the stepping motor drive pulse may be set to be more than two times the rate of sampling signal SC in a fixed manner. This also improves the followability of the stepping motor of position error.

The number of data tracks recorded in magnetic tape 17 is not limited. The structure of the magnetic heads shown in FIGS. 3 or 10 may be used as one unit.

Thus, according to the present invention, a position closed-loop control of high precision is possible with a relatively simple structure to realize tracking of high precision by a magnetic head in a fixed head type magnetic recording/reproduction device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic head positioning device for adjusting the position of a magnetic head with respect to a magnetic tape according to a servo signal reproduced from a servo track recorded on said magnetic tape, comprising:

a pair of servo track reproduce heads for reproducing a signal from said servo track, said pair of servo track reproduce heads being arranged to trace different portions widthwise of said magnetic tape;

magnetic head moving means for moving said magnetic head along said widthwise direction of said magnetic tape, said magnetic head moving means including a stepping motor responsive to an input pulse for providing rotation, the rotation amount of said stepping motor determining the moving distance of said magnetic head;

subtracting means for obtaining the difference between output signals of said pair of servo track reproduce heads; and driving means, responsive to an output signal of said subtracting means, for driving said stepping motor, said driving means including polarity detecting means for obtaining the polarity of the output signal of said subtracting means, determination means for making determination whether the absolute value of an output signal of said subtracting means is not less than a predetermined reference value, and motor rotating means, responsive to the outputs of said polarity detecting means and said determination means, for applying a pulse signal to said stepping motor for driving said stepping motor for rotation.

2. The magnetic head positioning device according to claim 1, wherein the pulse applying operation of said motor rotating means is inhibited when said determination means indicates that the absolute value of the output signal of said subtracting means is not more than said predetermined reference value.

3. The device according to claim 1, wherein said driving means comprises level detecting means for detecting the level of an output signal of said subtracting means, and rate modify means for modifying a rate of a pulse signal applied to said stepping motor.

4. The device according to claim 3, wherein said rate modify means comprises pulse generating means for generating a plurality of pulse signal trains having different rates, and pulse selecting means responsive to an output of said level detecting means for selecting one pulse signal train of said plurality of pulse signal trains.

5. The magnetic head positioning device according to claim 1, wherein said magnetic tape comprises first and second servo tracks provided on opposite sides of a central line in a direction of the width of said magnetic tape, said pair of servo track reproduce heads having a first servo track reproduce head to reproducing a signal from said first servo track and a second servo track reproduce head for reproducing a signal from said second servo track, said first and second servo track reproduce heads being arranged so that a portion near said central line does not overlap with a corresponding servo track when the difference in both output signals is substantially zero.

6. The device according to claim 1, wherein said magnetic tape comprises one servo track, said pair of servo track reproduce heads being arranged at both widthwise sides of said servo track in a position staggered in said widthwise direction of said magnetic tape.

7. A magnetic head positioning apparatus for adjusting the position of a magnetic head along a widthwise direction of magnetic tape, the magnetic head having first and second servo heads for respectively reproducing first and second servo signals from first and second servo tracks of the magnetic tape and a data head for reproducing a data signal from a data track of the magnetic tape, the magnetic head positioning apparatus comprising:

magnetic head moving means for moving the magnetic head along the widthwise direction of the magnetic tape;

subtraction means, coupled to the first and second servo heads, for determining a difference between the first and second servo signals; and driving means, coupled to said subtraction means, for generating a pulse signal for driving said magnetic head moving means in accordance with the determined difference to position the data head along the data track, said driving means having polarity detecting means, coupled to said subtraction means, for obtaining the polarity of the determined difference, determination means, coupled to said subtraction means, for determining if an absolute value of the determined difference is not less than a predetermined reference level, and motor rotating means, responsive to outputs of said polarity detecting means and said determination means, for outputting the pulse signal.

8. The magnetic head positioning apparatus of claim 7, wherein said magnetic head moving means comprises a stepping motor having a motor shaft which rotates in accordance with the pulse signal output said driving means for moving the magnetic head.

9. The magnetic head positioning apparatus of claim 7, wherein the data head is disposed on the magnetic head in between the first and second servo heads.

10. A method of positioning a magnetic head along a widthwise direction of a magnetic tape, the magnetic head having first and second servo heads for respectively reproducing first and second servo signals from first and second servo tracks of the magnetic tape and a data head for reproducing a data signal from a data track of the magnetic tape, the method comprising the steps of:

a) determining a difference between the first and second servo signals;

b) determining the polarity of the determined difference;

c) determining if an absolute value of the determined difference is greater than a predetermined reference level; and d) moving the magnetic head along the widthwise direction of the magnetic tape in accordance with the determinations of said steps b) and c) to position the data head along the data track.

11. The method of positioning a magnetic head of claim 10, further comprising inhibiting said step d) of moving when it is determined in said step c) that the determined absolute difference is less than the predetermined reference level.

12. A magnetic head positioning device for adjusting the position of a magnetic head with respect to a magnetic tape according to a servo signal reproduced from a servo track recorded on said magnetic tape, comprising:

a pair of servo track reproduce heads for reproducing a signal from said servo track, said pair of servo track reproduce heads being arranged to trace different portions widthwise of said magnetic tape;

magnetic head moving means for moving said magnetic head along said widthwise direction of said magnetic tape, said magnetic head moving means including a stepping motor responsive to an input pulse signal for providing rotation, the rotation amount of said stepping motor determining the moving distance of said magnetic head;

subtracting means for obtaining the difference between output signals of said pair of servo track reproduce heads;

determination means for determining if an output signal of said subtracting means is greater in magnitude than a predetermined reference value; and motor rotation control means, responsive to said determination means, for applying the input pulse signal to said stepping motor to drive said stepping motor for rotation.

13. The magnetic head positioning device according to claim 12, wherein said motor rotation control means comprises inhibition means, responsive to indication by said determination means that the output signal of said subtracting means is not greater in magnitude than said predetermined reference value, for inhibiting supply of the input pulse signal to said stepping motor to inhibit rotation of said stepping motor.

14. The magnetic head positioning device according to claim 12, wherein said predetermined reference value is not less than a level of the output signal of said subtracting means which corresponds to a difference requiring a half step of rotation of said stepping motor.

15. The magnetic head positioning device according to claim 12, wherein said motor rotation control means comprises modifying means, responsive to indication by said determination means that the output signal of said subtracting means is greater in magnitude than said predetermined reference value, for increasing a frequency of the input pulse signal applied to said stepping motor.

16. The magnetic head positioning device according to claim 15, wherein said modifying means comprises means for increasing the frequency of the input pulse signal according to the magnitude of the output signal of said subtracting means.

17. The magnetic head positioning device according to claim 15, wherein said modifying means comprises:
pulse generating means for generating a plurality of trains of pulse signals having different rates; and
selection means for selecting one of said plurality of trains of pulse signals as the input pulse signal in accordance with the magnitude of the output signal of said subtracting means.

* * * * *